United States Patent Office 2,754,220
Patented July 10, 1956

2,754,220

PERMEABLE PLASTER MOLD

George R. Gardner, Berea, Ohio, assignor to Aluminum Company of America, Pittsburgh, Pa., a corporation of Pennsylvania No Drawing. Application November 29, 1952,
Serial No. 323,339

6 Claims. (Cl. 106—38.3)

This invention relates to molds or mold parts formed of gypsum plaster which have a permeability to gases on the order of that possessed by the common sand molds and yet possess the advantages associated with plaster molds.

Gypsum plaster, also known as plaster of Paris, has been used for many years as a material for making molds of extremely low permeability in which ornamental and precision metal castings have been produced because of the relatively smooth surface imparted to the casting and the faithful reproduction of the original article or model which it is possible to obtain. The plastic mixture for molding is prepared, as is well understood, by adding not only enough water to the calcined gypsum, $CaSO_4 \cdot \frac{1}{2}H_2O$, to produce the fully hydrated material, $CaSO_4 \cdot 2H_2O$, but enough to give the mixture a consistency which will permit easy pouring. Upon setting the mold will then contain not only combined water of crystallization but uncombined or free water. To pour molten metal into such a mold would cause the formation of a considerable quantity of steam with resultant adverse effect upon the soundness of the metal casting. Because of the low permeability of such molds, it was considered necessary to completely dehydrate them prior to use even though that diminished their strength and promoted spalling and cracking. A further disadvantage present in the dehydrated type of mold is its low heat conductivity which causes a slow freezing of the molten metal with the attendant possibilities of promoting segregation and perhaps a coarse grain structure. By reason of the expense in manufacturing such molds and their low physical properties they never became competitive with conventional sand molds.

Some of the serious weaknesses of the dehydrated plaster molds were later overcome in molds produced by what became known as the Antioch process. In this process an initial plaster cast is formed which has practically no permeability but by subsequent partial dehydration followed by re-hydration recrystallization of the mold material is brought about with attendant increase in permeability. The molds have a coarse granular interior and are covered with a thin smooth skin on all exposed surfaces. Good quality castings have been made in such molds but their cost is relatively high as compared to that of sand molds.

Another improvement in making plaster molds consisted in preparing a plastic molding mixture by adding water to a dry mixture of alpha gypsum, a filler material and a foaming agent and beating air into the mass. It was found to be difficult to obtain uniformity in the mixture and there was such a variation in size of the air bubbles that it was difficult to produce uniform castings having a very smooth surface.

It is an object of this invention to provide uniform fully hydrated gypsum plaster molds which have the strength and permeability of dry or green sand molds and yet possess a very smooth surface and high dimensional accuracy. Another object is to provide plaster molds having a uniform structure and properties throughout the mass. Still another object is to provide fully hydrated plaster molds containing free water that have a high enough permeability to permit the ready escape of steam formed upon contact of molten metal with the mold without adverse effect upon the resultant metal castings. A further object is to provide low cost molds without sacrifice in the surface finish of castings produced in the molds.

I have found that aerated fully hydrated gypsum plaster molds containing uniformly distributed interconnected air bubbles or cells having a diameter not exceeding 0.020" are highly useful in making castings possessing a superior finish and very accurate dimensions. Such molds are characterized by compressive strengths of at least 50 and not over 250 p. s. i. and a permeability on the American Foundrymen Society (A. F. S.) scale of at least 20 and not over 200. These ranges of strength and permeability correspond to the ranges specified for green and dry sand molds and cores. It has been found that these ranges must be observed to obtain acceptable castings in commercial operations.

The principal constituent of molds which constitutes at least 50% of the mass and which provides the basic quality or characteristic, is gypsum plaster. One kind of plaster which is preferred for my high precision molds, known as alpha gypsum, is one derived from the calcination of high purity gypsum rock under steam pressure as described in U. S. Patent 1,901,051 to W. S. Randel et al. This form of high purity gypsum when mixed with the proper amount of water yields plaster products characterized by a greater strength and density than those made from the more common variety produced by the kettle process. Alpha gypsum also possesses the advantage of requiring less water to develop a normal pouring consistency than the conventional plaster of Paris. However, the common kettle type of calcined gypsum can also be used in the production of permeable molds, it should be understood.

Enough water must be retained in the mold mass to form the completely hydrated material, $CaSO_4 \cdot 2H_2O$, in order to gain the necessary strength. The combined water and any free water also serve to supply a mild chilling action upon the molten metal which is generally advantageous. Since the mold has a high degree of permeability any steam or gases generated by contact of hot metal with the mold can easily escape and not form bubbles or pockets such as often occurs in molds having little or no permeability. Furthermore, the permeability of the molds is great enough to permit escape of steam arising from small amounts of free or uncombined water. It is therefore unnecessary to remove all free water prior to using the mold. Whether any uncombined water should remain is usually determined by the nature of the casting being poured and the complexity of the mold cavity, generally less than 2% by weight of free water is permissible. To remove any undesired free water the mold may be dried such as by heating it to a temperature between 180 and 240° F. for a period of ½ to 4 hours.

The permeability of the mold, as mentioned above, is provided by interconnected finely divided uniformly distributed air bubbles or cells in the plaster matrix. The presence of pores or individual separated air bubbles does not give the proper structure for casting purposes. Furthermore, to achieve a smooth surface on the casting the bubbles at or close to the surface of the mold must be fine enough to prevent any penetration by the molten metal. If relatively large bubbles form on or close to the face of the mold they create indentations for the metal to enter and thus form pimples on the cast metal surface. This is highly objectionable, of course, where a smooth surface is required and no machining is permitted. I have found that plaster molds having uniformly distributed air bubbles or cells of a diameter of not over 0.020", and preferably less than 0.015" in diameter, possess a surface which will insure a smooth metal casting. I have found it possible to consistently produce molds containing bubbles of only 0.005 to 0.010" in diameter and still retain a high permeability.

In addition to having the foregoing maximum size, the air bubbles or cells must be uniformly distributed throughout the plaster mold body and not be confined to the surface or in certain regions. I have found that unless the distribution of the air bubbles or cells is uniform and extends to the surface of the mold body the mold does not possess the required permeability. The presence of bubbles at the surface of the mold interconnected with those in the interior makes it possible for gas to readily enter the mold body when molten metal is introduced into the mold cavity and thus avoid the occurrence of blows or cold shuts on the surface of the casting. It is believed that because of the very small size of the bubbles or cells they are resistant to collapse during pouring of the plaster against the mold pattern. As a result of a dense skin is not formed over the mold surface which might impede the flow of gas into or out of the mold body. The molds are therefore characterized by the substantial absence of a dense relatively non-porous skin.

To achieve a high permeability the bubbles must be interconnected, that is, the walls of adjoining bubbles should be punctured or ruptured so that a more or less continuous path is provided for the escape of gases formed in the mold during the casting operation. The rupture of the bubble walls appears to occur during setting of the plaster. Up to that time the individual bubbles must be maintained to avoid coalescence and formation of large bubbles. The maintenance of the desired bubble structure seems to be related to the foaming agent employed.

The initial bubble structure is attained by converting the plaster slurry into a foam-like pourable body. Air is beaten into the slurry by a suitable mixer to generate the foam. Generally the volume of foam should be between 80 and 130% that of the slurry from which it is produced. Once the desired increase in volume has been attained it is necessary to further treat the foam to obtain the uniform small sized bubbles mentioned hereinabove and to insure uniform distribution of the bubbles throughout the mass. This can be accomplished by rotating a perforated disc operating at relatively high speed of say 2000 R. P. M. in the foam for a relatively short period of time. The treatment with the rotating disc serves to break up any large bubbles and reduce them to a small uniform size not exceeding 0.020" in diameter. This process of creating such small bubbles uniformly distributed throughout the foam mass is herein referred to as "homogenization." Usually the total time for generating the foam and homogenizing it covers a period of from about 50 to 120 seconds depending upon the volume of foam being treated and the size of the rotating disc.

The permeability of the molds can be varied to some extent by the process of making the plaster slurry. However, to obtain a venting of gases and vapors equivalent to that in sand molds the permeability of the plaster molds should be within the A. F. S. range of 20 to 200. This property of the molds can be ascertained on standard specimens with standard testing equipment such as employed for determinations on sand mold samples. Plaster molds having a permeability within the foregoing range possess the added advantages over sand molds of a superior surface and dimensional accuracy and thus are capable of yielding superior castings.

Plaster molds must obviously possess a sufficient strength to permit handling and withstand the pressure incident to the casting of metal. Compressive strengths of 50 to 250 p. s. i. are adequate to meet all ordinary requirements. It is to be understood, of course, that the size and shape of some molds may require a stronger plaster than others. The strength can be controlled within these limits by the choice of calcined gypsum, the amount and kind of filler employed and to some extent by the quantity of water retained in the mold.

The system of gates and risers employed on the plaster molds herein described follows the practice generally used in the manufacture of sand molds. The selection of a particular gate and riser system is determined by the size and complexity of the casting to be produced.

The foaming agents found to be useful in preparing the plaster foam and permeable molds are those belonging to the group of substances known as sulfonated hydrocarbons. These substances must be stable toward the plaster, that is, they should not react with the gypsum to form insoluble compounds while on the other hand they should have very little or no effect upon the setting of the plaster. They must be capable of forming relatively stable bubbles which do not easily collapse or coalesce with other bubbles and yet not produce a bubble wall which will not rupture as the plaster sets. Among the group of sulfonated hydrocarbons which meet these requirements are those known as the sodium salts of alkyl aryl sulfonates, for example, sodium alkyl naphthalene sulfonate. Such substances sold under the trade names Alkanol B, Sulfatate B, Ultrawet 30E and Detergent D–40 have proved to be satisfactory. Generally 0.2 to 0.7% by weight is sufficient to produce the required foaming action.

The preparation of a typical mold having the characteristics referred to above will now be described. To make a plaster mixture weighing about 1.85 lbs., 1 lb. of calcined gypsum is slowly added to 0.85 lb. of an aqueous solution containing about 0.4% by weight of a water soluble sulfonated hydrocarbon foaming agent as the solution is stirred. The mixture is further agitated with the introduction of air until a foam is created having a volume of about 90 to 100% greater than that of the initial mixture. Immediately following the attainment of the desired volume of foam the slurry is homogenized by further agitation to break down any large bubbles and produce uniformly distributed finely divided air bubbles. The introduction of the air and the homogenizing treatment may be accomplished by use of a perforated disc rotated at about 2000 R. P. M. Following the agitation and homogenization plaster foam is poured into suitable molds and allowed to set. Upon removal of the plaster body from the mold it should be dried at a temperature of 180 to 240° F. over a period of ½ to 4 hours depending on the size of the plaster article. It will be found that the resultant plaster body will have air bubbles or cells of less than 0.020" in diameter uniformly distributed throughout the mass, the mold will have a permeability of about 30 to 50 on the A. F. S. scale and a compressive strength of 200 to 250 p. s. i.

It has been found that such precision cast parts as aluminum alloy blades of torque converters can be easily and accurately cast in molds of the kind described above. Other types of castings can, of course, be made in molds of this type.

I have found that both aluminum and magnesium and the alloys in which these metals predominate can be readily cast in the permeable plaster molds. However, other non-ferrous metals and alloys can be poured in these molds with similar results.

For some purposes it may be desirable to add other materials to the plaster, such as talc, asbestos or silica to control some properties of the mold or to dilute the plaster. In general not more than about 50 percent by weight of these materials should be incorporated with the plaster and usually much less. Very often less than 3% of talc or asbestos is sufficient. In addition to using fillers, such as the foregoing, it may be desirable to employ small amounts, usually less than 1%, of materials which accelerate or retard the setting of the plaster. Terra alba, sodium sulfate, sodium chloride, sodium citrate and citric acid are illustrative of substances often used for these purposes.

This application is a continuation-in-part of my copending application Serial No. 179,101, filed August 12, 1950, now abandoned.

Having thus described my invention and an embodiment thereof, I claim:

1. A permeable gypsum plaster mold containing fully hydrated gypsum as the principal component, said mold having interconnected air bubbles, each bubble having a diameter not exceeding 0.020", said bubbles being uniformly distributed throughout the mold body and perforating the external surface thereof, said mold being characterized by a permeability exceeding 20 on the A. F. S. scale and by a compressive strength of at least 50 p. s. i.

2. A permeable gypsum plaster mold containing fully hydrated gypsum as the principal component, said mold having interconnected air bubbles, each bubble having a diameter not exceeding 0.020", said bubbles being uniformly distributed throughout the mold body and perforating the external surface thereof, said mold being characterized by a permeability 20 to 200 on the A. F. S. scale and by a compressive strength of 50 to 250 p. s. i.

3. A permeable gypsum plaster mold containing fully hydrated gypsum as the principal component, said mold having interconnected air bubbles, each bubble having a diameter not exceeding 0.015", said bubbles being uniformly distributed throughout the mold body and perforating the external surface thereof, said mold being characterized by a permeability of 20 to 200 on the A. F. S. scale and by a compressive strength of 50 to 250 p. s. i.

4. A permeable gypsum plaster mold containing fully hydrated alpha gypsum as the principal component, said mold having interconnected air bubbles, each bubble having a diameter not exceeding 0.020", said bubbles being uniformly distributed throughout the mold body and perforating the external surface thereof, said mold being characterized by a permeability exceeding 20 on the A. F. S. scale and by a compressive strength of at least 50 p. s. i.

5. A permeable gypsum plaster mold containing fully hydrated gypsum as the principal component, and water in excess of that required for complete hydration of said gypsum, said mold having interconnected air bubbles, each bubble having a diameter not exceeding 0.020", said bubbles being uniformly distributed throughout the mold body and perforating the external surface thereof, said mold being characterized by a permeability of 20 to 200 on the A. F. S. scale and by a compressive strength of 50 to 250 p. s. i.

6. A permeable gypsum plaster mold containing fully hydrated gypsum as the principal component and a smaller amount of filler, said mold having interconnected air bubbles, each bubble having a diameter not exceeding 0.020", said bubbles being uniformly distributed throughout the mold body and perforating the external surface thereof, said mold being characterized by permeability of 20 to 200 on the A. F. S. scale and by a compressive strength of 50 to 250 p. s. i.

References Cited in the file of this patent

UNITED STATES PATENTS 2,529,835   Dailey et al. _____ Nov. 14, 1950